United States Patent [19]

Kashyap

[11] Patent Number: 6,094,291
[45] Date of Patent: Jul. 25, 2000

[54] OPTICAL MODULATOR

[75] Inventor: Raman Kashyap, Suffolk, United Kingdom

[73] Assignee: British Telecommunications public limited company, London, United Kingdom

[21] Appl. No.: 09/068,959

[22] PCT Filed: Apr. 6, 1998

[86] PCT No.: PCT/GB98/01010
§ 371 Date: May 20, 1998
§ 102(e) Date: May 20, 1998

[87] PCT Pub. No.: WO98/47041
PCT Pub. Date: Oct. 22, 1998

[30] Foreign Application Priority Data

Apr. 14, 1997 [EP] European Pat. Off. ............. 97302524

[51] Int. Cl.[7] .............................. G02F 1/03; G02F 1/035
[52] U.S. Cl. .................................. 359/245; 385/2; 385/3
[58] Field of Search ................... 385/2.3, 8, 14, 385/16; 359/237, 245, 279

[56] References Cited

U.S. PATENT DOCUMENTS

| | | | |
|---|---|---|---|
| 4,791,388 | 12/1988 | Sanford et al. ............................. | 385/2 |
| 5,082,349 | 1/1992 | Cordova-Plaza et al. .................. | 385/2 |
| 5,239,407 | 8/1993 | Brueck et al. ............................. | 359/326 |
| 5,247,601 | 9/1993 | Myers et al. .............................. | 385/122 |
| 5,617,499 | 4/1997 | Brueck et al. ............................. | 385/122 |
| 5,867,615 | 2/1999 | Shi ............................................ | 385/3 |

OTHER PUBLICATIONS

Arbore et al, "Analysis of the Insertion Loss and Extinction Ratio of Two–Mode Fiber Interferometric Devices", Optical Fiber Technology 2, 400–407 (1996), Article No. 0046.

Fujiwara et al, "UV–Excited Poling and Electrically Tunable Bragg Gratings in a Germanosilicate Fiber", Optical Fiber Communication . . . Summaries OFC '95, San Diego, Feb. 26–Mar. 3, 1995, Institute of Electrical and Electronics engineers, The University of Sydney, pp. 347–350.

Kreit et al, "Two–Mode Fiber Interferometer/Amplitude Modulator" Applied Optics, Dec. 1, 1986, USA, vol. 25, No. 23, ISSN 0003–6935, pp. 4433–4438, XP002039365.

Zhao et al, "Zero–Gap Directional Coupler Switch Integrated into a Silicon–on Insulator for 1.3–$\mu$ m Operation", Optics Letters, Oct. 15, 1996, Opt. Soc. America, USA, vol. 21, No. 20, ISSN 0146–9592, pp. 1664–1666, XP000630400.

*Primary Examiner*—Georgia Epps
*Assistant Examiner*—David N. Spector
*Attorney, Agent, or Firm*—Nixon & Vanderhye P.C.

[57] ABSTRACT

An optical modulator includes a bi-moded fiber for supporting first and second different optical transmission modes, coupled between input and output single mode fibers. The two modes in the bi-moded fiber interfere and the intensity of the radiation that passes to the single mode output fiber is a function of the relative phases of the first and second modes. The bi-moded fiber is electrically poled and is provided with modulating electrodes. When a modulating voltage from a modulating source is applied to the electrodes, the refractive index of the waveguide for the first transmission mode is altered relative to the refractive index of the waveguide for the second mode such as to change the phase difference between the modes at the entrance to the output fiber so as to control the intensity of optical radiation that passes through the output fiber.

18 Claims, 2 Drawing Sheets

OPTICAL MODULATOR

BACKGROUND OF THE INVENTION

1. Field of the invention

This invention relates to an optical modulator for use in waveguides such as optical fibres or planar substrate devices.

2. Related Art

Hitherto, an optical multi-waveguide interference filter has been proposed in which a first waveguide capable of single mode transmission, is coupled to a second waveguide capable of supporting at least two transmission modes. A third waveguide supporting a single mode is used to pick up light from the second, multimode waveguide. In use, light in a single mode passes from the first waveguide into the second waveguide where it is transmitted in two modes, which interfere with one another. By an appropriate selection of the is length of the second waveguide and its optical characteristics, the interfering modes produce an amplitude peak at the entrance to the third waveguide, which shifts diametrically across the input to the third waveguide as a function of wavelength. The filter is described in detail in "An Optical Multi-waveguide Interference Filter" M. Earnshaw et al, Optics Communications 116 (1995), 339–342, May 1, 1995.

Similar two mode fibre interferometric devices have been proposed by D. Kreit et al in "Two-mode fibre interferometer/amplitude modulator" Applied Optics, December 1996, Vol 25, No 23, pp 4433–4438, which involve stretching the fibre to vary the interference between the modes, so that the optical output is a function of applied stress.

Reference is also directed to M. A. Abore et al "Analysis of the insertion loss and extinction ratio of two-mode fibre interferometric devices" which discloses an optically pumped bi-moded fibre in which an input optical signal switches the interference between the modes in the fibre, so as to switch the output.

It has also been proposed to sense temperature by sensing mode-mode interference in a birefringent optical fibre, as described by W. Eickoff, Optics Letters, Vol. 6, No. Apr. 4, 1981 pp 204–206.

Electro-optic modulation of a silica-based fibre has been proposed by T. Fujiwara et al, Electronics Letters, Mar. 30, 1995, Vol. 31 No. 7, pp 573–575. In order to pole the fibre and provide it with an electro-optic coefficient, a voltage was applied to wires inserted into the fibre whilst irradiating it with ultraviolet radiation. Thereafter, the application of a voltage to the wires produced a phase shift for optical radiation transmitted through the fibre.

SUMMARY OF THE INVENTION

The present invention provides a new approach for producing modulation in an optical waveguide.

In accordance with the invention there is provided an optical modulator comprising: a waveguide for supporting first and second different optical transmission modes, an output for optical radiation from the waveguide, the intensity of the radiation that passes through the output being a function of the relative phases of the first and second modes at the output, and modulating means operable to apply an electric field to the waveguide so as to change the phase difference between the modes at the output and thereby control the intensity of optical radiation that passes through the output.

The waveguide may be formed of electrically poled material, which may be thermally poled.

The modulator according to the invention may be formed in an optical fibre, such as silica-based fibre, which has been thermally poled. The fibre may include electrode means running along the length thereof to permit a modulating voltage to be applied.

A modulator according to the invention may also be embodied in a planar waveguide device.

The invention also includes a method of modulating optical radiation travelling in a waveguide that has an output for optical radiation therefrom, and that supports first and second different optical transmission modes such that the intensity of the radiation that passes through the output is a function of the relative phases of the first and second modes at the output, the method comprising applying an external electric field to the waveguide so as to change the phase difference between the modes at the output and thereby control the intensity of optical radiation that passes through the output.

The modulation in accordance with the invention may be carried out with an optical waveguide comprising a plural mode region capable of supporting plural transmission modes, with an electric field responsive refractive index, an electrode for applying an electric modulating field to the plural mode region and an output from the plural mode region to provide an optical output as a function of the applied modulating field.

Stated differently, the optical waveguide may comprise a dual mode region having an electrically poled core, an output for single mode radiation and an electrode for applying an electric modulating field to the poled core.

BRIEF DESCRIPTION OF THE DRAWINGS

In order that the invention may be more fully understood embodiments thereof will now be described by way of example with reference to the accompanying drawings, in which.

DETAILED DESCRIPTION

Figure 1:
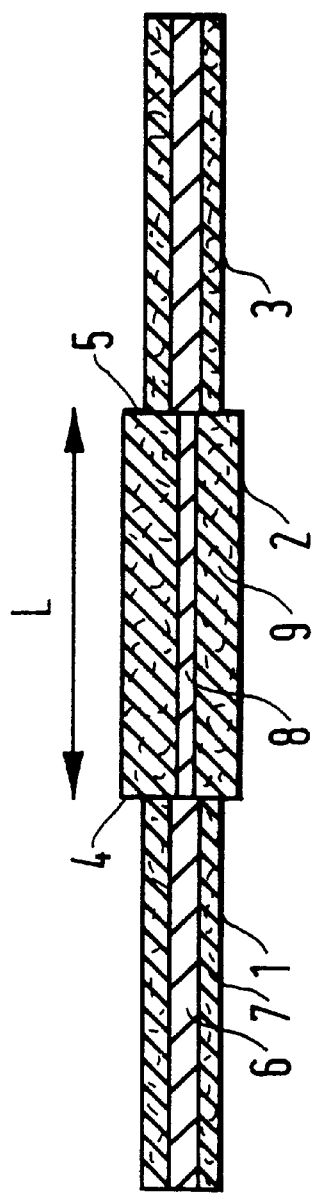
FIG. 1 is a schematic cross sectional view of a fibre modulator in accordance with the invention.

Referring to FIG. 1, an optical fibre arrangement including a modulator according to the invention, is shown. The arrangement comprises a first, single mode fibre 1, a second, dual mode fibre 2 and a third length of fibre 3, which operates in single mode. The fibres 1 and 3 are fusion butt-jointed to opposite ends of the fibre 2, by means of fusion splices 4, 5.

The fibres 1, 3 are conventional single mode fibres as used for optical telecommunications. They typically comprise silica based fibres with a Ge/B doped core 6, surrounded by a $SiO_2$ cladding 7. Typically, the core diameter is 8 μm and the exterior cladding diameter is 125 μm. By way of example, the refractive index of the cladding $n_{cladding}$ to light at 1550 nm is approximately 1.45 and the difference between the refractive indices of the core $n_{core}$ and the cladding $n_{cladding}$, $\Delta n = n_{core} - n_{cladding} = 4.5 \times 10^{-3}$.

The second fibre 2 includes a core 8 surrounded by a cladding 9 and is of the same general construction as the single mode fibres 1 and 3 but is capable of supporting multiple transmission modes. As is known in the art, multiple mode transmission can be achieved when a fibre parameter v known as the normalised frequency, exceeds a particular value, where $$v = \frac{2\pi a}{\lambda} \sqrt{(n_{core}^2 - n_{cladding}^2)}$$

where $\alpha$ is the radius of the core. Assuming that the refractive index $n \cong n_{core} \cong n_{cladding}$, and $\Delta n = n_{core} - n_{cladding}$, then this can be expressed as:

$$v \simeq \frac{2\pi a}{\lambda} \sqrt{2n\Delta n} \qquad (1)$$

Typically, multimode operation can occur if v exceeds a value of 2.405. From equation (1), it can be seen that this can be achieved by making an appropriate selection the of values of $\Delta n$ and the core radius $\alpha$. Thus, by a suitable selection of fibre parameters, the fibres 1 and 3 have a v value of less than 2.405 and the fibre 2 has a value v that is greater than 2.405.

Figure 2:
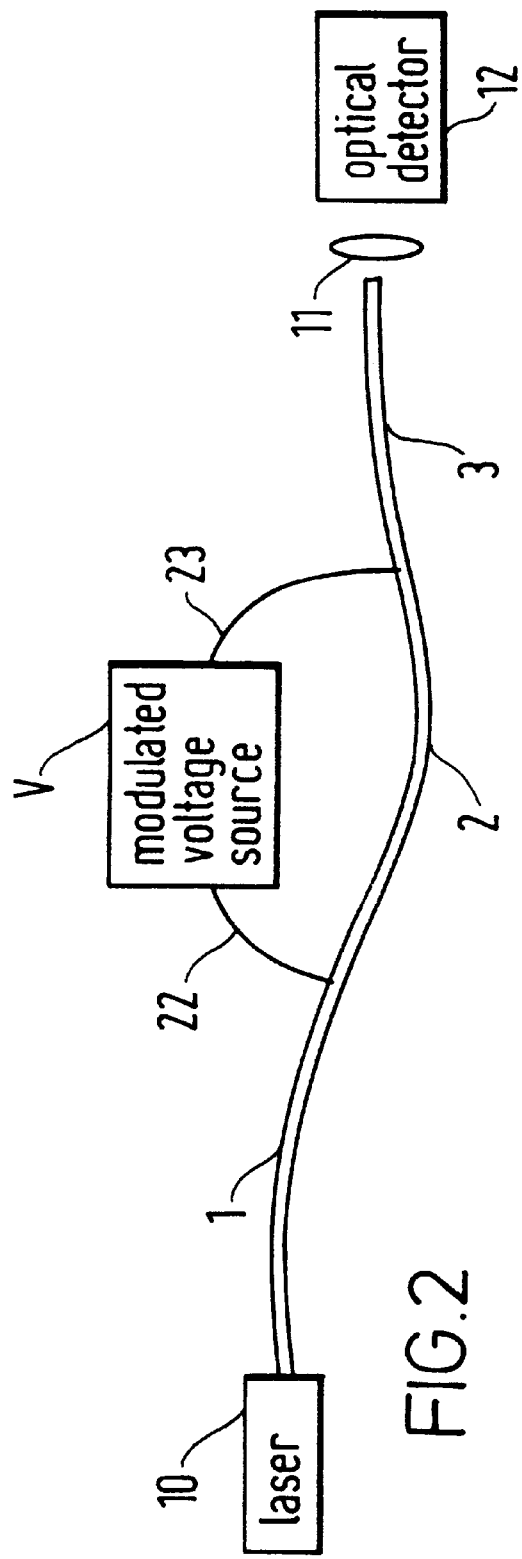
FIG. 2 is a schematic illustration of the fibre modulator connected to a laser source and an optical detector
Figure 3:
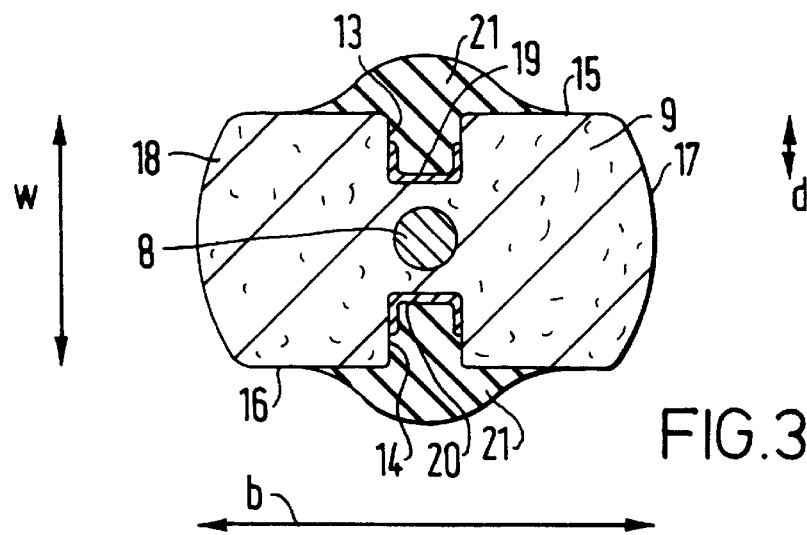
FIG. 3 is a cross sectional view through the fibre 2 shown in FIGS. 1 and 2.

In the following example, the core 8 of the multimode fibre 2 has a radius $\alpha$ that is less than that of the single mode fibres 1, 3, as will be described in more detail later, together with an appropriate value of $\Delta n$, higher than that of the single mode fibres 1, 3, in order to satisfy the conditions required to support dual mode transmission. The fibre 2 may be formed of germania doped silica, with or without boron sodium or defect rich dopant such as cerium. The fibre in this example supports the LP 01 and LP 11 transmission modes. A typical length L for the fibre 2 is 2.4 cm. The length of the fibres 1, 3 is not critical Referring to FIG. 2, the fibre arrangement of FIG. 1 is connected at one end to a laser 10 operative in the 1500 nm telecommunications band, which injects optical radiation into the core 6 of fibre 1. Light emanating from the core 6 of fibre 3 is focused by a lens 11 onto an optical detector 12. The optical fibre 2 operates as a modulator as will now be explained in more detail. FIG. 3 illustrates a transverse cross section of the fibre 2 and generally corresponds to the optical fibre shown in FIG. 9 of our co-pending WO-A-97/28481 (PCT/GB97/00266) filed on Jan. 30, 1997. When viewed in cross section, the fibre has a relatively broad dimension b and a relatively narrow dimension w in a second direction normal to the first direction. Two recesses 13, 14 having a depth d extend from planar surface regions 15, 16 towards the core 8 along the length of the fibre. The planar surface regions 15, 16 are connected by curved, cylindrical surface regions 17, 18 that extend along the length of the fibre. Typically, the breadth b is 250 $\mu$m, the width w is 100 $\mu$m and the depth of the recesses is of the order 30 $\mu$m. The bottom of the recesses 13, 14 are spaced from the core by 9–15 $\mu$m. The diameter of the core 8 is typically 4–8 $\mu$m and in this example is 6 $\mu$m. The value of $\Delta n$ for the fibre 2 is 0.012 and $n_{cladding}$ is 1.45.

The recesses are coated with electrodes 19, 20, formed by evaporation of a metallic source and deposition of the vapour in the recesses. The electrodes 19, 20 may be formed of gold. The recesses thereafter are filled with an electrically insulating material such as silicon rubber 21 so as to protect the fibre from glass/air dielectric breakdown and flash-over. As shown in FIG. 2, external leads 22, 23 are connected to the electrodes 19, 20 respectively. Further details of the fibre structure, including details of its manufacture and the dopant concentrations used, are given in WO-A-97/28481 (PCT/GB97/00266).

The core of fibre 2 is photosensitive to UV light. When doped with Ge or Ge and B, it is photosensitive to radiation with a wavelength of 244 nm. The material of the fibre can be poled by heating the fibre and applying an electric field between the electrodes 19, 20, whilst directing UV light at 244 nm towards the fibre. This is described in more detail in T. Fujiwara, D. Wong, Y. Zhao, S. Flemming v. Grishina and S. Poole "UV Excited Poling and Electrically Tunable Bragg Gratings in a Germo Silicate Fibre", post deadline paper OFC 1995 (February 1995). Further details of fibre poling methods can be found in "Phase Matched Second-Harmonic Generation by Periodic Poling of Fused Silica" R. Kashyap et al Appl. Phys. Lett. 64 (11) Mar. 14, 1994 pp 1332–1334; "High Second-Order Non-linearities in Poled Silicate Fibres" P. G. Kazansky et al, Optics Letters, May 15, 1995, Vol. 19 No. 10 pp 701–703 and "Electro-Optic Phase Modulation in a Silica Channel Waveguide" A. C. Liu et al Optics Letters Vol 19, No. 7 Apr. 1, 1994, pp 466–468. As a specific example, the poling voltage was applied directly to the electrodes 19, 20 and was up to 2 kv over 35 $\mu$m, giving a field strength of the order of $5-6\times10^7$ v/m. Alternatively, the poling voltage may be applied to the fibre using an additional electrode on a Si wafer as described in "A Poled Electrooptic Fiber" X. C. Long et al, IEEE Photonics Technology Lett. Vol 8, No 2, February 1996, pp 227–229. The poling temperature was 260–280° C.

It has been found that after poling, when an electric voltage is applied to the electrodes 19, 20, the fibre presents a different refractive index to the LP 01 and the LP 11 transmission mode resulting in a voltage-dependent phase difference between them. As a result, the two modes interfere by an amount dependent upon the applied voltage. It has been found that by varying the applied voltage, the amplitude peak produced as a result of interference can be swept across the entrance to the single mode core of the third fibre 3 shown in FIG. 1, at the butt joint 5. Thus, by varying the voltage produced by the modulated voltage source V, the intensity of light received at the optical is detector 12 can be varied. Thus, the device can be used as a modulator.

A specific example of the applied voltage range, is up to 1 kv. This corresponds to a range of applied field of $0 \rightarrow 10^7$ v/m. The contrast ratio achievable is of the order of 100%. The bit rate that can be achieved by means of the described example optical modulator according to the invention, is of the order of ten times greater than can be achieved with a comparable conventional lithium niobate doped optical fibre modulator and is typically >20 GHz.

Another example of the invention will now be described with reference to FIGS. 4 and 5. The optical waveguide is formed in a planar substrate, typically made of silicon. Details of how a silicon substrate can be processed in order to provide a doped silica waveguide as an elongate strip, surrounded by an undoped silica cladding region, is discussed in detail in our U.S. Pat. No. 5,342,478 dated Aug. 30, 1994.

Figure 4:
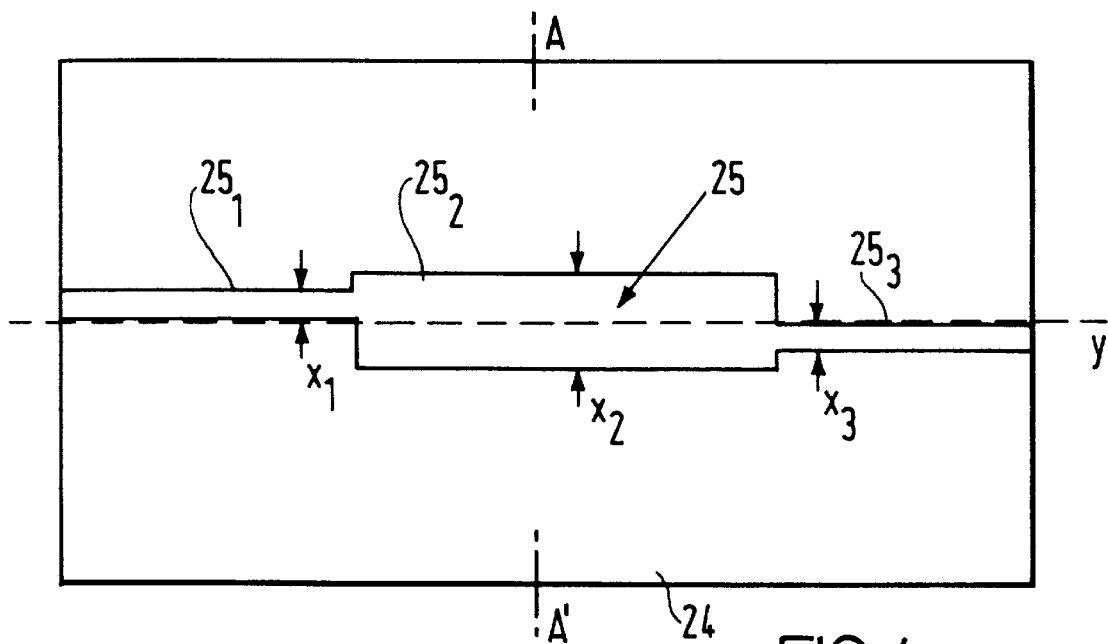
FIG. 4 is a schematic plan view of a planar optical waveguide device incorporating a modulator according to the invention.
Figure 5:
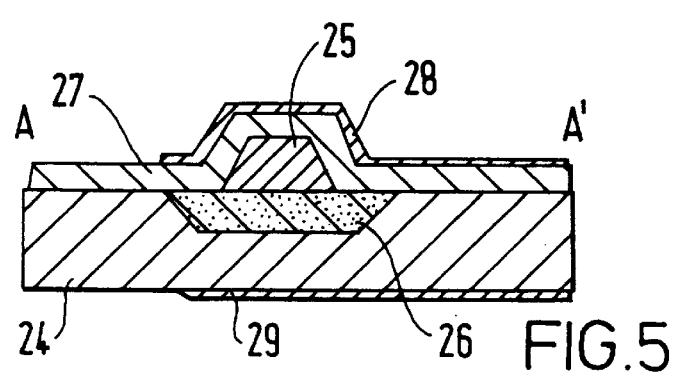
FIG. 5 is a schematic cross section taken along the line A—A' of FIG. 4.

As shown in FIGS. 4 and 5, the device comprises a silicon substrate 24 and an elongate waveguide 25 formed on the substrate 24. As shown in the cross section of FIG. 5, the substrate 24 is formed with a trench filled with thermal oxide 26 onto which a doped oxide layer is formed in order to form the core of the waveguide. The oxide layer (not shown) is plasma etched, using conventional lithographic techniques in order to form the pattern 25 shown in plan view in FIG. 4. Thereafter, the region 25 is covered with an undoped oxide layer 27. The oxide layers 26 and 27 thus form a cladding around the core region 25 of the waveguide. The process may utilise the well known technique of local oxidisation of silicon (LOCOS), which is summarised in our previously mentioned U.S. Pat. No. 5,342,578.

As can be seen in FIG. 4, the waveguide core 25 includes a first region $25_1$ capable of single mode operation, the second region $25_2$, wider than the first region, capable of supporting bi-moded transmission, and a third region $25_3$ capable of single mode operation. Typical transverse dimensions $x_1$, $x_2$, $x_3$ for the regions $25_{1, 2, 3}$ are 5 µm, 10 µm and 5 µm respectively. A typical thickness for the region 25 is of the order of 6 µm. The bi-moded region $25_2$ is thus wider than the single moded regions $25_{1, 3}$ in contrast to the previously described fibre configuration of FIG. 1. In the device of FIG. 4, the value of the refractive index difference Δn between the core and the cladding is the same for the bi-moded and single moded regions in order to simplify construction of the planar device, and so in order to satisfy the condition of equation (1) for bi-moded operation, the core dimension $x_2$ (corresponding to 2α in equation (1)) is made greater than the dimensions $x_1$, $x_3$. A typical value for Δn is $5 \times 10^{-3}$ and a typical approximate value of $n_{cladding}$ is 1.450. An example of the core dopant used is germania to a concentration of approximately 3 mole percent. The single moded regions $25_1$, $25_3$ are offset from the longitudinal centreline y of the core 25, in the manner described by Earnshaw et al, supra.

A metallisation layer 28, formed by a known evaporative technique, overlies the waveguide in the second, bi-moded region $25_2$, of the core and a corresponding electrode 29 is formed on the underside of the substrate 24. The electrodes 28, 29 can thus be used to pole the core region $25_2$ by thermal poling and/or by UV radiation, in the manner previously explained. The electrodes 28, 29 are connected to ohmic contact pads (not shown) for connection to the leads 22, 23, shown in FIG. 2 so that a modulating voltage can be applied from the source V. In use, the temperature, field strengths and voltages used for poling and modulation are substantially the same as for the embodiment of FIG. 1.

Thus, in use, light from the laser 10 is directed into the first, single mode portion of the core $25_1$ from which it passes into the bi-modal region $25_2$. The two modes of propagation interfere with one another, in the manner previously described. The phase difference between the interfering modes depends on the voltage V applied to the electrodes 26, 27 in the bi-modal region $25_2$ and the interference peak which can be produced at the entrance to the third single mode region $25_3$ is shifted laterally across the width of the entrance depending on the applied voltage. As a result, the intensity of the light entering the single mode region $25_3$ depends on the applied voltage. Thus, as previously explained, the device can be used to modulate the light output that is fed to the optical detector 12.

Other devices in accordance with the invention will be apparent to those skilled in the art. For example, those skilled in the art will appreciate that in practice, a conventional single mode optical fibre will, to a certain extent, support bi-modal operation. Thus, it will be possible to practise the invention in a conventional single mode fibre, by poling it and providing modulation electrodes, and forcing it into bi-moded operation. Thus the invention can be performed in a single length of fibre without the need for the butt joints shown in FIG. 1.

As used herein, the term "optical radiation" includes both visible and non-visible optical radiation, such as ultraviolet and infrared.

What is claimed is:

1. An optical modulator comprising:
    a waveguide of electrically-poled germania-doped silica supporting first and second different optical transmission modes,
    an output for optical radiation from the waveguide, the intensity of the radiation that passes through the output being a function of the relative phases of the first and second modes at the output, and
    modulating means disposed to apply an electric field to the waveguide so as to change the phase difference between said modes at the output and thereby control the intensity of optical radiation that passes through the output.

2. An optical modulator as in claim 1 wherein the waveguide is formed of electro-optic material.

3. An optical modulator as in claim 2 including an electrode to apply the electric field to the waveguide.

4. An optical modulator as in claim 3 wherein the electrode is mounted on the waveguide.

5. An optical modulator as in claim 4 wherein the electrode is provided in a longitudinal recess in the waveguide.

6. An optical modulator as in claim 1 wherein the electrically poled silica is thermally poled.

7. An optical modulator as in claim 1 including an input to the waveguide, for feeding optical radiation into the waveguide.

8. An optical modulator as in claim 7 including a single mode fibre coupled to the input to feed optical radiation into the waveguide.

9. An optical modulator as in claim 1 wherein the waveguide comprises an optical fibre.

10. An optical modulator as in claim 9 wherein the fibre is configured to support dual transmission modes.

11. An optical modulator as in claim 1 wherein an optical fibre is coupled to the output.

12. An optical modulator as in claim 1 wherein the waveguide comprises a planar structure on a substrate.

13. An optical modulator as in claim 1 wherein the waveguide has been poled using UV radiation.

14. A method for modulating the intensity of optical radiation said method comprising:
    applying an electric field an electrically-poled germania-doped silica waveguide that has an output for optical radiation therefrom, and that supports first and second different optical transmission modes such that the intensity of the radiation that passes through the output is a function of the relative phases of the first and second modes at the output, and
    changing the field to change the phase difference between the modes at the output to thereby control the intensity of optical radiation that passes through the output.

15. A method of modulating optical radiation travelling in an electrically-poled germania-doped silica waveguide that has an output for optical radiation therefrom, and that supports frist and second different optical transmission modes such that the intensity of the radiation that passes through the output is a function of the relative phases of the first and second modes at the output, the method comprising:

applying an external electric field to the electrically-poled germania-doped silica waveguide so as to change the phase difference between the modes at the output and thereby control the intensity of optical radiation that passes through the output.

16. In an optical modulator including a waveguide that has an output for optical radiation therefrom, and that supports first and second different optical transmission modes, such that the intensity of the radiation that passes through the output is a function of the relationship of the transmission modes at the output, the improvement comprising:

an electric modulator disposed to apply an external electric field to an electrically-poled germania-doped silica waveguide so as to change the phase relationship between modes at an output thereof and thereby variably control the intensity of optical radiation that passes through the output.

17. An electrically-poled germania-doped silica optical waveguide comprising:

a plural mode region of said waveguide capable of supporting plural transmission modes, with an electric field responsive refractive index, an electrode for applying an electric modulating field to the plural mode region, and an output from the plural mode region to provide an optical output as a function of the applied modulating field.

18. An electrically-poled germania-doped silica optical waveguide comprising:

a dual mode region of said waveguide having an electrically poled core, an output for single mode radiation, and an electrode for applying an electric modulating field to the poled core.

* * * * *